US006985631B2

(12) United States Patent
Zhang

(10) Patent No.: US 6,985,631 B2
(45) Date of Patent: Jan. 10, 2006

(54) SYSTEMS AND METHODS FOR AUTOMATICALLY DETECTING A CORNER IN A DIGITALLY CAPTURED IMAGE

(75) Inventor: Tong Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 10/079,663

(22) Filed: Feb. 20, 2002

(65) Prior Publication Data

US 2003/0156201 A1    Aug. 21, 2003

(51) Int. Cl.
G06K 9/46    (2006.01)
G06K 9/48    (2006.01)
(52) U.S. Cl. ...................... 382/237; 382/199
(58) Field of Classification Search ............... 382/168, 382/172, 173, 199, 237, 254, 266, 272, 275, 382/276; 358/462, 471, 488, 520, 522, 530
See application file for complete search history.

(56) References Cited

U.S. PATENT DOCUMENTS

| | | | | |
|---|---|---|---|---|
| 4,845,764 A | * | 7/1989 | Ueda et al. | 382/146 |
| 4,866,783 A | * | 9/1989 | Ohyama | 382/199 |
| 5,420,704 A | * | 5/1995 | Winkelman | 358/520 |
| 5,548,415 A | * | 8/1996 | Tanaka et al. | 358/462 |
| 5,774,237 A | * | 6/1998 | Nako | 358/471 |
| 5,918,192 A | | 6/1999 | Tomaszewski | 702/85 |
| 6,011,635 A | * | 1/2000 | Bungo et al. | 358/488 |
| 6,101,274 A | * | 8/2000 | Pizano et al. | 382/176 |
| 6,285,800 B1 | * | 9/2001 | Yamazaki et al. | 382/266 |
| 6,304,313 B1 | | 10/2001 | Honma | 355/18 |
| 6,400,848 B1 | * | 6/2002 | Gallagher | 382/254 |
| 6,466,693 B1 | * | 10/2002 | Otsu et al. | 382/176 |
| 6,697,497 B1 | * | 2/2004 | Jensen et al. | 382/100 |

OTHER PUBLICATIONS

"Geometric Correction of Digitized Art," G. F. McLean, Graphical Models and Image Processing vol. 58 No. 2, pp. 142-154, Mar. 1996.

* cited by examiner

*Primary Examiner*—Andrew W. Johns
*Assistant Examiner*—Amir Alavi

(57) ABSTRACT

In one embodiment, the present invention is related to a method for processing a digitally captured image that comprises an imaged document. The method may comprise: transforming the digitally captured image into a binary image; searching the binary image to detect a plurality of edges of the imaged document; and analyzing the detected plurality of edges to determine at least one corner associated with the imaged document; wherein the transforming, searching, and analyzing are performed by programmable logic associated with a processor-based system.

18 Claims, 10 Drawing Sheets

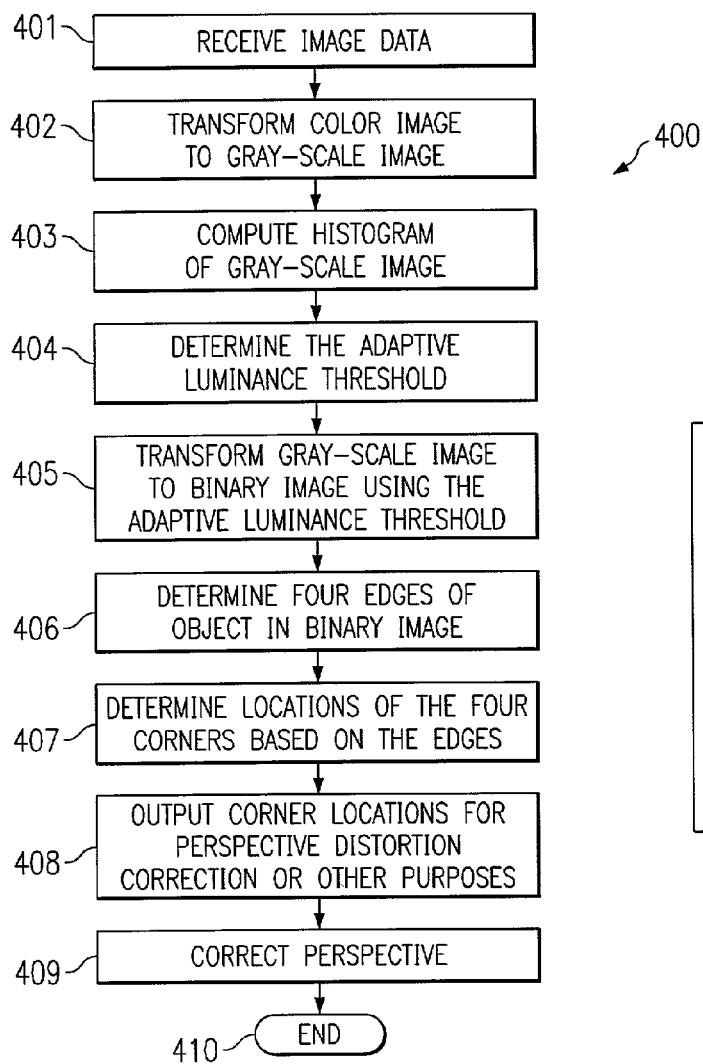
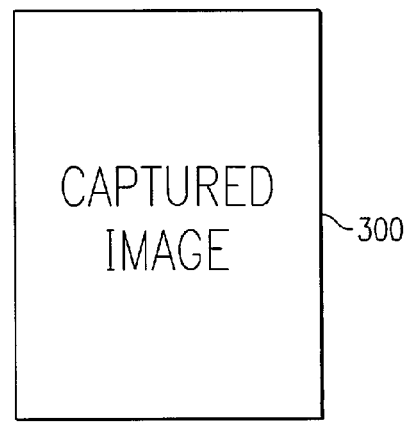
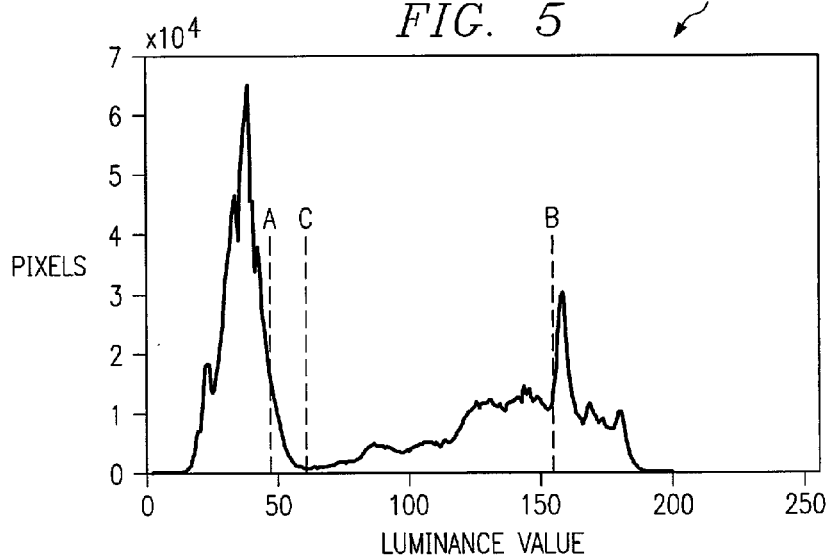

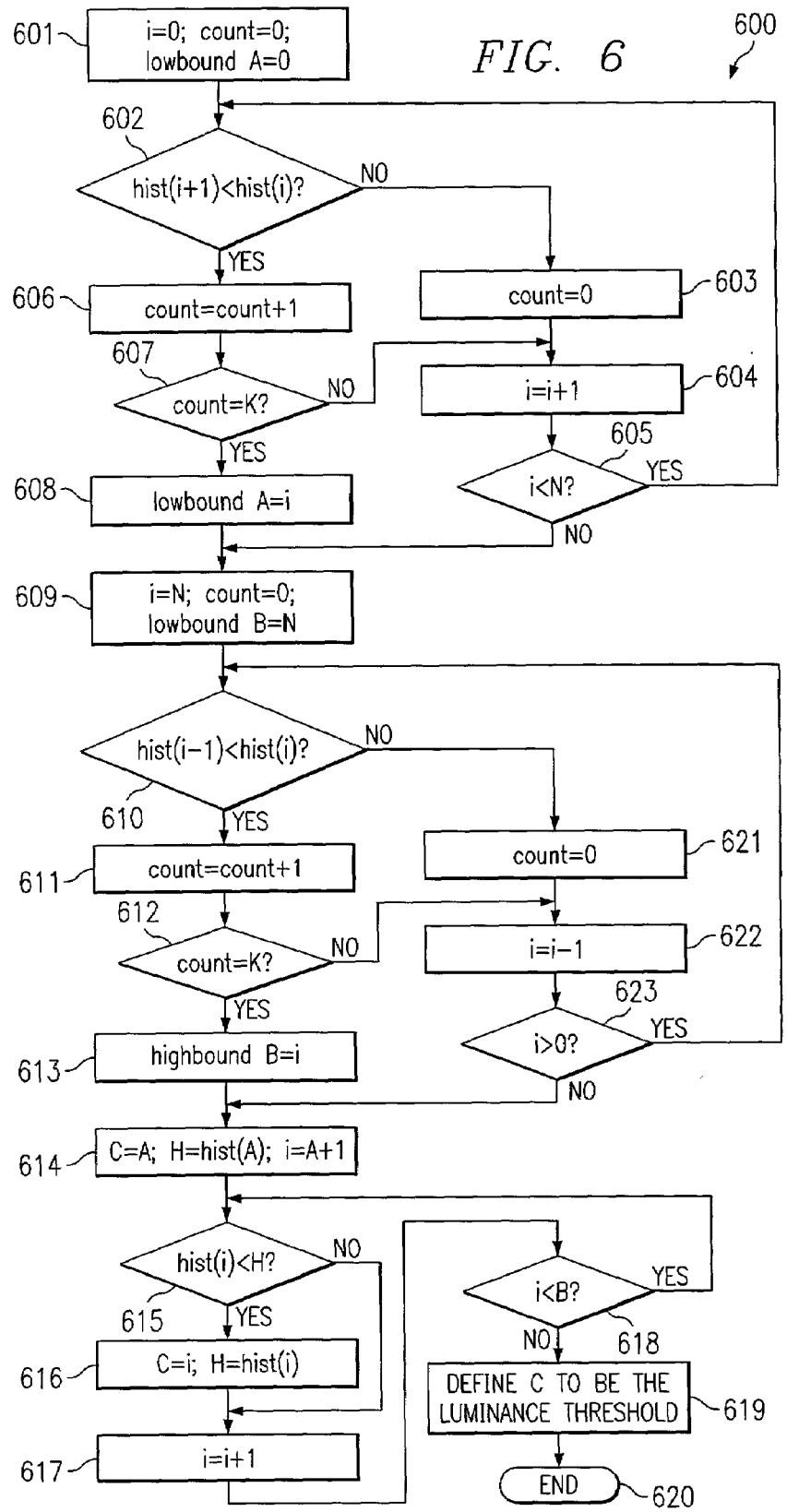

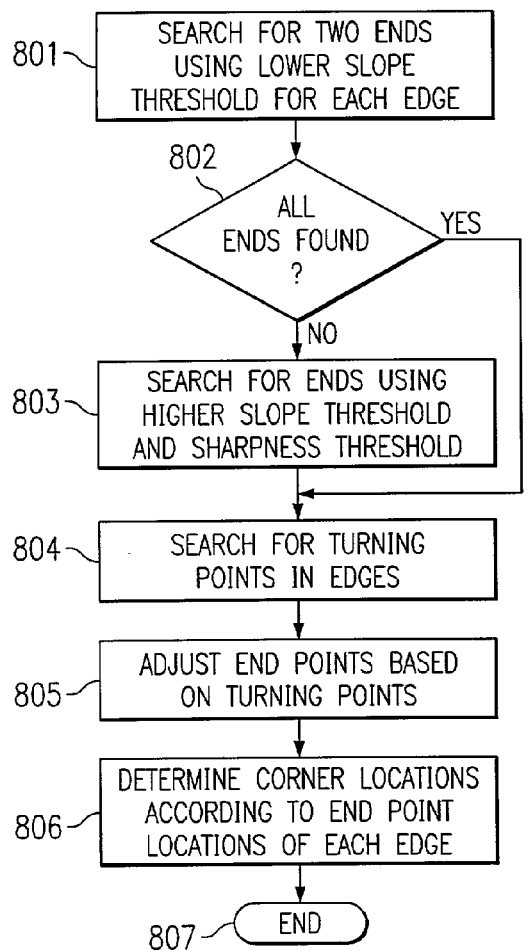
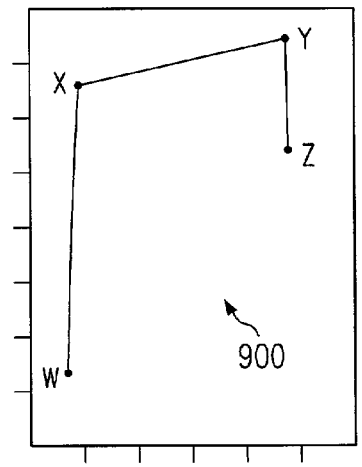
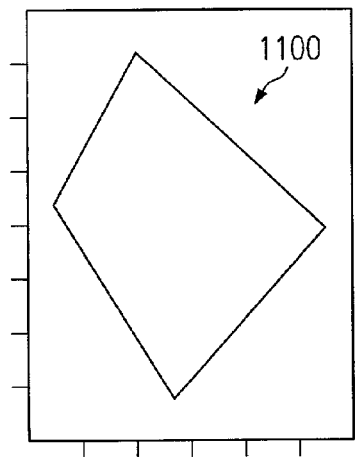
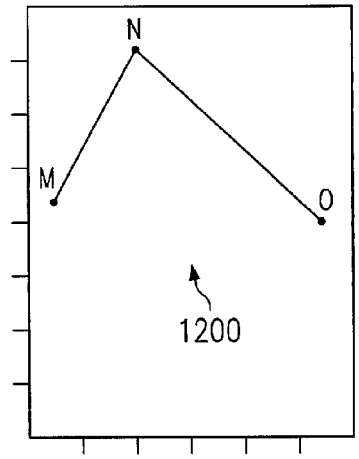

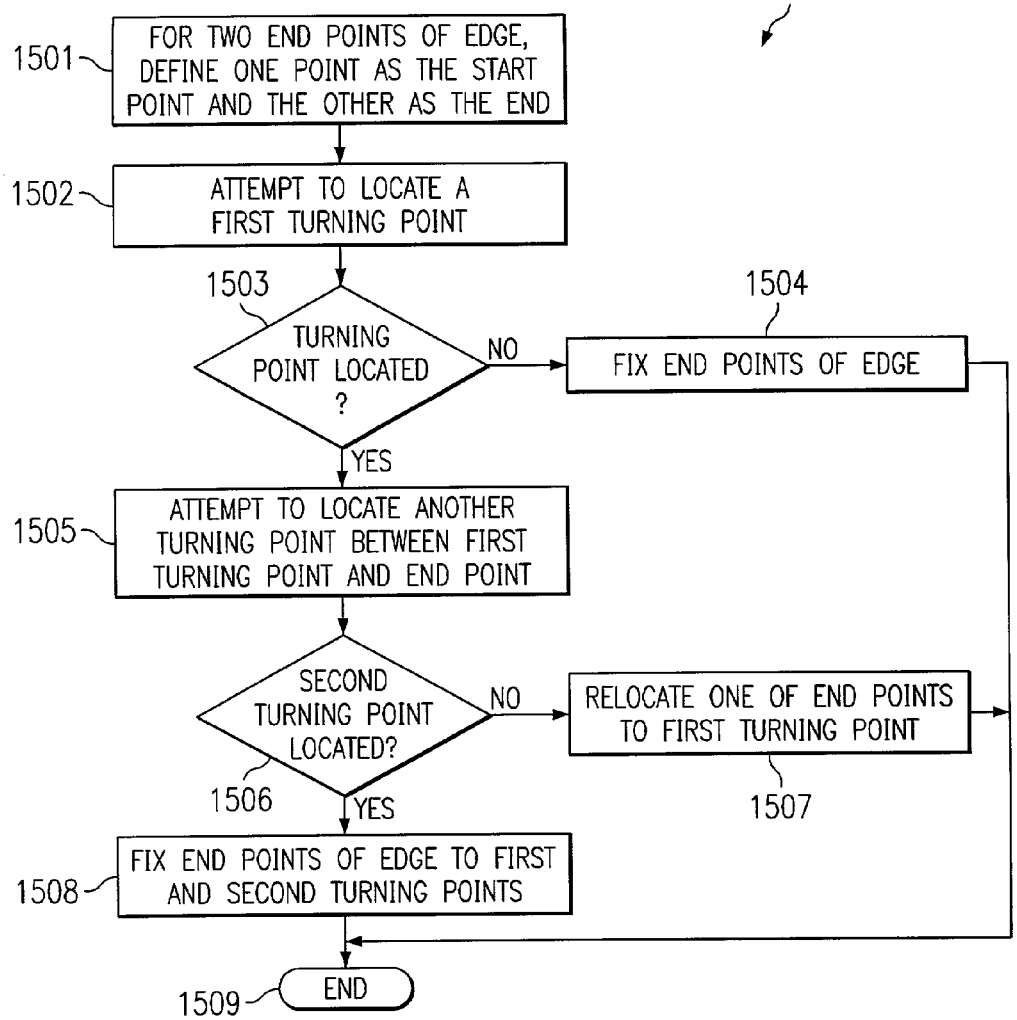
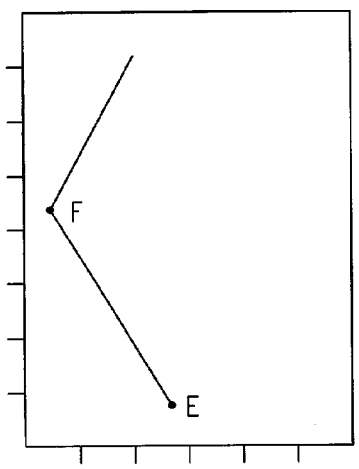
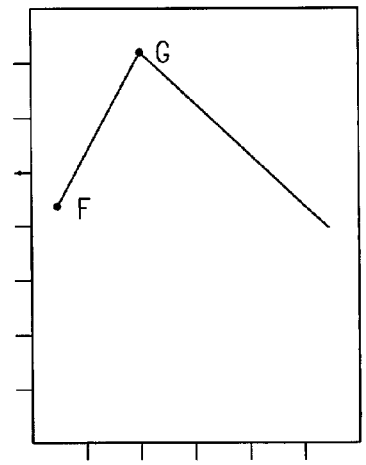

SYSTEMS AND METHODS FOR AUTOMATICALLY DETECTING A CORNER IN A DIGITALLY CAPTURED IMAGE

FIELD OF THE INVENTION

The present invention relates, in general, to systems and methods for processing a digitally captured image and, more particularly, for automatically detecting corners of an imaged document.

BACKGROUND OF THE INVENTION

FIG. 1A depicts digital camera 100 capturing an image of document 101 according to the prior art. Light is reflected from document 101 and is received by optical subsystem 102. Optical subsystem 102 optically reduces the image of document 101 to focus the image on charge-coupled device (CCD) 103. CCD 103 is typically implemented as a two-dimensional array of photosensitive capacitive elements. When light is incident on the photosensitive elements of CCD 103, charge is trapped in a depletion region of the semiconductor material of the elements. The amount of charge associated with the photosensitive capacitive elements is related to the intensity of light incident on the respective elements received over a sampling period. Accordingly, the image is captured by determining the intensity of incident light at the respective photosensitive capacitive elements via sampling the elements.

The analog information produced by the photosensitive capacitive elements is converted to digital information by analog-to-digital (A/D) conversion unit 104. A/D conversion unit 104 may convert the analog information received from CCD 103 in either a serial or parallel manner. The converted digital information may be stored in memory 105 (e.g., random access memory). The digital information is then processed by processor 106 according to control software stored in ROM 107 (e.g., PROM, EPROM, EEPROM, and/or the like). For example, the digital information may be compressed according to the JPEG standard. Additionally or alternatively, other circuitry (not shown) may be utilized to process the captured image such as an application specific integrated circuit (ASIC). User interface 108 (e.g., a touch screen, keys, and/or the like) may be utilized to edit the captured and processed image. The image may then be provided to output port 109. For example, the user may cause the image to be downloaded to a personal computer (not shown) via output port 109.

The quality of the captured image is dependent on the perspective or positioning of digital camera 100 with respect to document 101. Specifically, if digital camera 100 is off-angle, the captured image of document 101 may be skewed as shown in captured image 150 of FIG. 1B. Therefore, off-angle positioning may appreciably reduce the readability of the captured image of document 101.

Accordingly, the image data may be uploaded to a personal computer for processing by various correction algorithms. The algorithms are employed to correct the distortion effects associated with off-angle images of documents. The correction algorithms require a user to manually identify the corners of a region of a captured image. By measuring the spatial displacement of the identified corners from desired positions associated with a rectangular arrangement, an estimation of the amount of distortion is calculated. The correction algorithm then processes the imaged document to possess the desired perspective and size as necessary.

BRIEF SUMMARY OF THE INVENTION

In one embodiment, the present invention is related to a method for processing a digitally captured image that comprises an imaged document. The method may comprise: transforming the digitally captured image into a binary image; searching the binary image to detect a plurality of edges of the imaged document; and analyzing the detected plurality of edges to determine at least one corner associated with the imaged document; wherein the transforming, searching, and analyzing are performed by programmable logic associated with a processor-based system.

BRIEF DESCRIPTION OF THE DRAWINGS

FIG. 3 depicts a perspective corrected imaged document according to embodiments of the present invention.

FIG. 4 depicts a flowchart of processing steps to correct the perspective of an imaged document according to embodiments of the present invention.

FIG. 5 depicts a luminance histogram according to embodiments of the present invention.

FIG. 6 depicts a flowchart for determining an adaptive luminance threshold according to embodiments of the present invention.

FIG. 8 depicts a flowchart of analysis of end points of detected edges according to embodiments of the present invention.

FIG. 9 depicts a detected edge that comprises multiple edges of an imaged document according to embodiments of the present invention.

FIG. 11 depicts a frame of a document that was imaged at a relatively large off-angle where the frame is detected according to embodiments of the present invention.

FIG. 12 depicts an edge associated with a document that was imaged at a relatively large off-angle where the edge is detected according to embodiments of the present invention.

FIG. 15 depicts a flowchart for determining corner locations of an imaged document according to embodiments of the present invention.

FIGS. 16A–16D depict detected edges with each edge comprising one turning point according to embodiments of the present invention.

DETAILED DESCRIPTION OF THE INVENTION

Figure 1A:
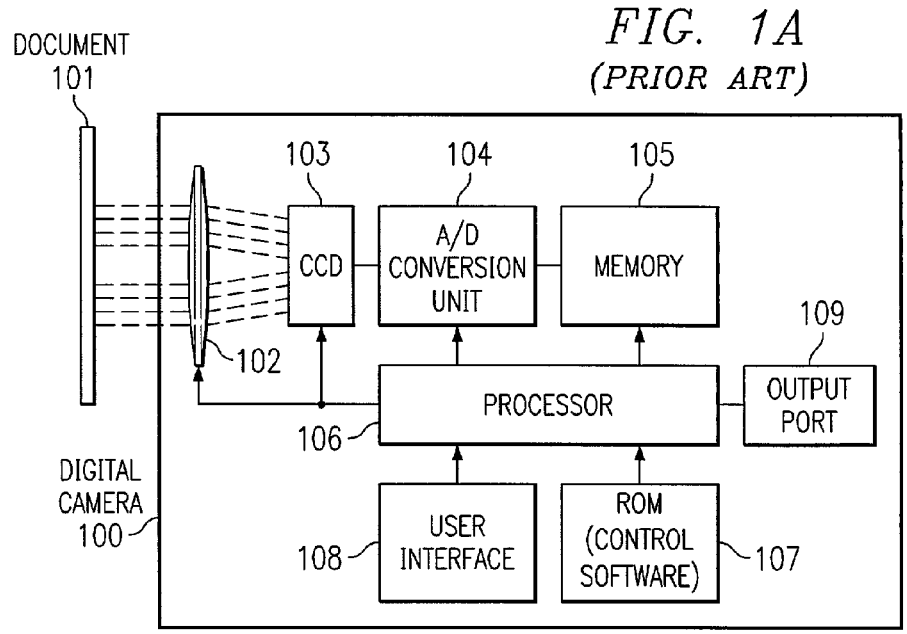
FIG. 1A depicts a block diagram of a digital camera according to the prior art.
Figure 2:
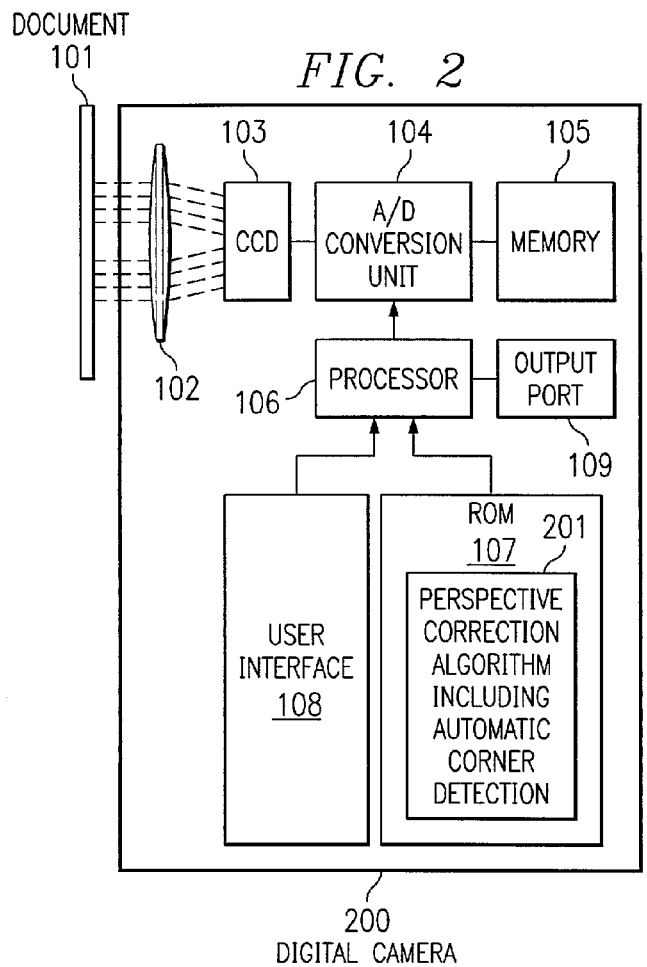
FIG. 2 depicts a block diagram of a digital camera according to embodiments of the present invention.

FIG. 2 depicts a block diagram of digital camera 200 according to embodiments of the present invention. Digital camera 200 comprises optical subsystem 102 that optically reduces light reflected from document 101. Document 101 may be any geometrically regular element. For example, document 101 may be a sheet of paper, a book, a photograph, a slide, a white board, a chalk board, and/or the like. The optical reduction causes the reflected light to be received by CCD 103 or other suitable optical detection structures (e.g., a cathode ray tube).

The analog information produced by the photosensitive capacitive elements (not shown) of CCD 103 is converted to digital information by analog-to-digital (A/D) conversion unit 104. A/D conversion unit 104 may convert the analog information received from CCD 103 in either a serial or parallel manner. The converted digital information may be stored in memory 105 (e.g., random access memory). The digital information is then processed by processor 106 according to control software stored in ROM 107. Alternatively, the control software may be stored in any other suitable type of computer-readable media (e.g., a hard drive). The digital information may be compressed according to the JPEG standard. Additionally or alternatively, other circuitry (not shown) may be utilized to process the captured image such as an application specific integrated circuit (ASIC). User interface 108 (e.g., a touch screen, keys, and/or the like) may be utilized to edit the captured and processed image. The image may then be provided to output port 109. For example, the user may cause the image to be downloaded to a personal computer (not shown) via output port 109.

Additionally, digital camera 200 includes software instructions that correct off-angle distortion associated with the captured image. Specifically, digital camera 200 includes software instructions to implement image correction algorithm 201, including automatic corner detection, according to embodiments of the present invention. Image correction algorithm 201 may transform an off-angle image such as imaged document 150 of FIG. 1B to an image such as corrected image 300 of FIG. 3. Moreover, image correction algorithm 201 does not require manual identification of document corners to perform the image correction.

Image correction algorithm 201 may be stored in non-volatile memory associated with digital camera 200 such as ROM 107. Alternatively, image correction algorithm 201 may be stored in hard disk memory, optical memory, memory stick memory, and/or the like. The software instructions of image correction algorithm 201 may be executed by processor 106 to digitally enhance an image of document 101 stored in RAM 105. Although embodiments of the present invention describe the operations of image correction algorithm 201 as occurring in association with processing by digital camera 200, the present invention is not so limited. The digital image may be uploaded to any other suitable processor-based system (e.g., a personal computer). The digital image may then be processed by software of the personal computer according to embodiments of the present invention if desired by the user. In other words, perspective correction algorithm 201 may reside in the personal computer.

FIG. 4 depicts flowchart 400 to illustrate corner detection performed by image correction algorithm 201 according to embodiments of the present invention. Flowchart 400 depicts various tasks at a relatively high-level. Accordingly, selected tasks of flowchart 400 will be discussed in greater detail below.

In step 401, image data of a captured document is received. The image data may be encoded utilizing any suitable graphical encoding format including but not limited to Tag Image File Format (TIFF), Joint Photographic Experts Group (JPEG) format, Graphics Interchange Format (GIF), Portable Network Graphics (PNG), bit-mapped (BMP) format, and/or the like.

In step 402, if the image data is in a color format, the color image is transformed into a gray-scale image. If the original image data is in RGB format (where R, G, and B respectively represent the intensity of the red, green, and blue chromatic components), the image data may be transformed to YCrCb format by the following transformations:

$$Y = 0.299*R + 0.587*G + 0.114*B + 0.5,$$

$$Cr = 0.713*(R-Y) + 128.5,$$

$$Cb = 0.564*(B-Y) + 128.5,$$

where Y is the luminance value, Cr and Cb are two chromatic values. Then, the value of Y is used as the intensity of the grayscale image. It shall be appreciated that the present invention is not limited to any particular color coordinate system and other transforms may be utilized according to embodiments of the present invention.

In step 403, a histogram of the gray-scale image is computed. From the histogram, the adaptive luminance threshold is determined (step 404). In step 405, the adaptive luminance threshold is utilized to transform the gray-scale image into a binary image (i.e., luminance less than the luminance threshold is mapped to zero and luminance greater than the luminance threshold is mapped to one). By applying an adaptive luminance threshold, embodiments of the present invention are quite robust to noise in the imaged document. Specifically, the adaptive luminance threshold may be utilized to enhance the contrast between the imaged document and other image details. After the binary transformation, the imaged document may be readily detected against the background data according to embodiments of the present invention. It shall be appreciated that the luminance threshold processing is by way of example only. Other suitable transforms may be utilized to enhance the contrast between the imaged document and the background according to embodiments of the present invention.

In step 406, four edges of the captured document are determined. From the four edges, four corners are determined (step 407). In step 408, the corner locations are outputted for perspective distortion correction or other purposes. In step 409, the perspective of the imaged document is corrected utilizing the outputted corner locations. In step 410, the process flow ends.

FIG. 5 depicts histogram 500 according to embodiments of the present invention. Histogram 500 may be constructed by counting the number of pixels that possess a luminance of a respective value. The horizontal axis of histogram 500 represents a luminance value (e.g., from zero to 255) while the vertical axis depicts the number of pixels at each respective luminance value.

To implement step 404 of flowchart 400, an adaptive luminance threshold may be determined by analyzing the histogram in the following manner. As shown in FIG. 5, a lower bound A is searched from the lowest luminance value (e.g., from the left as shown in FIG. 5). Lower bound A is the point where the histogram value has dropped significantly from a major peak (the major peak as searched from the left as depicted in FIG. 5). That is, the lower bound is searched for the histogram value that has dropped for K continuous luminance values (in embodiments of the present invention, K is selected to be 5, while other value of K may be used) from the major peak. A higher bound B is searched from the highest luminance value (e.g., from the right as shown in FIG. 5). The higher bound B is the point where the histogram value has dropped significantly from a major peak, i.e. the histogram value has dropped for K continuous luminance values. The point C is searched which has the lowest histogram value between A and B. Then, the luminance value at C is selected as the luminance threshold.

FIG. 6 depicts flowchart 600 that may be utilized to determine the adaptive threshold according to embodiments of the present invention. Step 601 initiates various variables such as i, count, and lowbound A. Steps 602–608 are operable to search the histogram implemented as the array hist( ) to determine lowbound A. Steps 606–607 determine whether the luminance value has dropped for K continuous luminance values. Steps 603–605 limit the search for the lower bound A to a maximum number of steps. Step 608 assigns the determined value to the variable lowbound A. Step 609 initializes variables i, count, and highbound B before another iterative analysis is performed to determine the value of highbound B. Iterative steps 610–613 and 621–623 search for the higher bound B. Steps 611–612 determine whether the luminance value has dropped for K continuous luminance values. Steps 621–623 limit the search for the higher bound B to a maximum number of steps. Step 613 assigns the determined value to the variable highbound B. Steps 614–618 searches the histogram between values associated with the lower bound A and the higher bound B for the minimum value. In step 619, the minimum value is defined to be the luminance threshold. In step 620, the process flow ends.

Figure 7A:
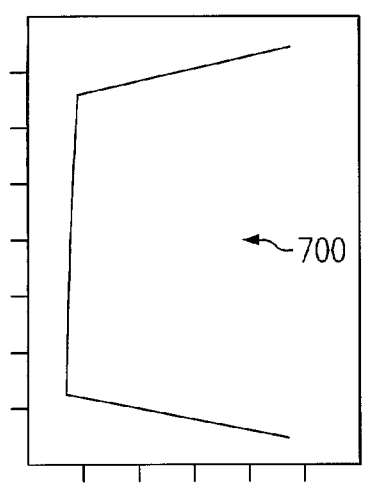
FIGS. 7A–7D depict detected edges according to embodiments of the present invention.
Figure 7B:
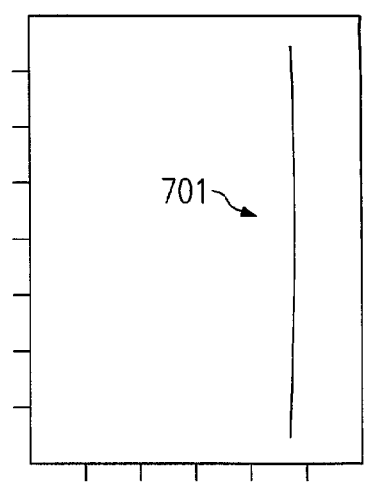
Figure 7C:
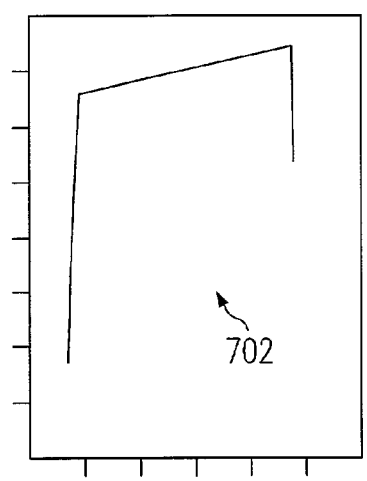
Figure 7D:
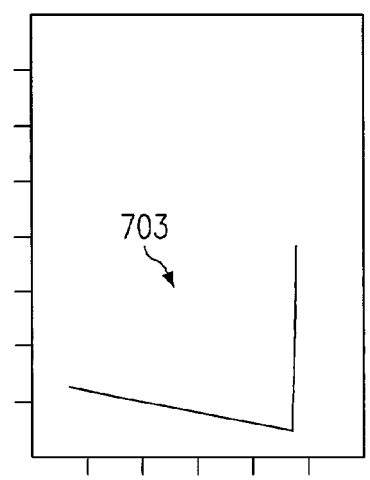
Figure 7E:
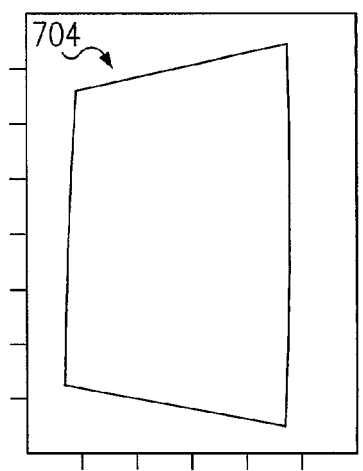
FIG. 7E depicts the union of the detected edges of FIGS. 7A–7D.

To implement step 406 of flowchart 400, the four edges of the document in the image data are determined from the binary image in the following manner. For each of the four edges, denoted as ELEFT, ERIGHT, ETOP, and EBOTTOM, respectively, the binary image is searched from the corresponding margin of the picture. For example, to determine ELEFT, at each row in the binary image, the binary image is searched from the left margin in the right direction for the first point where the intensity of M consecutive pixels in the row are different from that of the margin (i.e. if the margin is black, the pixels are white, or the other way round). In embodiments of the present invention, M is selected to equal five (5). However, other values may be used. FIG. 7A depicts detected edge 700 that corresponds to ELEFT according to this analysis. ERIGHT, ETOP, and EBOTTOM may be determined in a similar manner by initiating a search that begins at each respective margin. FIGS. 7B, 7C, and 7D respectively depict detected edges 701, 702, and 703 according to this analysis. FIG. 7E depicts frame 704 which is the union of detected edges 700 through 703. Accordingly, the outline or boundary of the imaged document is defined by frame 704.

To implement step 407 of flowchart 400, embodiments of the present invention are operable to determine corner locations by utilizing a lower slope threshold and, as appropriate, a higher slope threshold. FIG. 8 depicts flowchart 800 that illustrates detection of corner locations according to embodiments of the present invention. In step 801, the two ends of an edge are respectively searched using a lower slope threshold (ST1) for each edge. A logical comparison is made in step 802 to determine whether all ends have been located. If all ends have been located, the process flow proceeds to step 804. If not, the process flow proceeds to step 803. In step 803, a search is made for ends using a higher slope threshold and a sharpness threshold. In step 804, a search is made for turning points in the edges. In step 805, the end point locations are adjusted based on the turning points. In step 806, the corner locations are determined according to the ending point locations of each edge. In step 807, the process flow ends.

It shall be appreciated that a detected edge may contain parts of other edges. As an example, FIG. 9 depicts edge 900 that comprises portions of other "real" edges. Accordingly, it is appropriate to detect ending positions of an actual edge within the detected edge. For example, embodiments of the present invention may identify points X and Y from points W, X, Y, and Z as being the ending positions of edge 900.

When an edge is relatively flat (i.e., the edge possesses a relatively small angle with respect to its reference line), the angle of the portion of the edge that corresponds to the "real" edge is much smaller than the angle of other portions of the edge. For example, the angle between the portion XY and a horizontal reference line is much smaller than the angle between the portion XW and a horizontal reference line.

Figure 10:
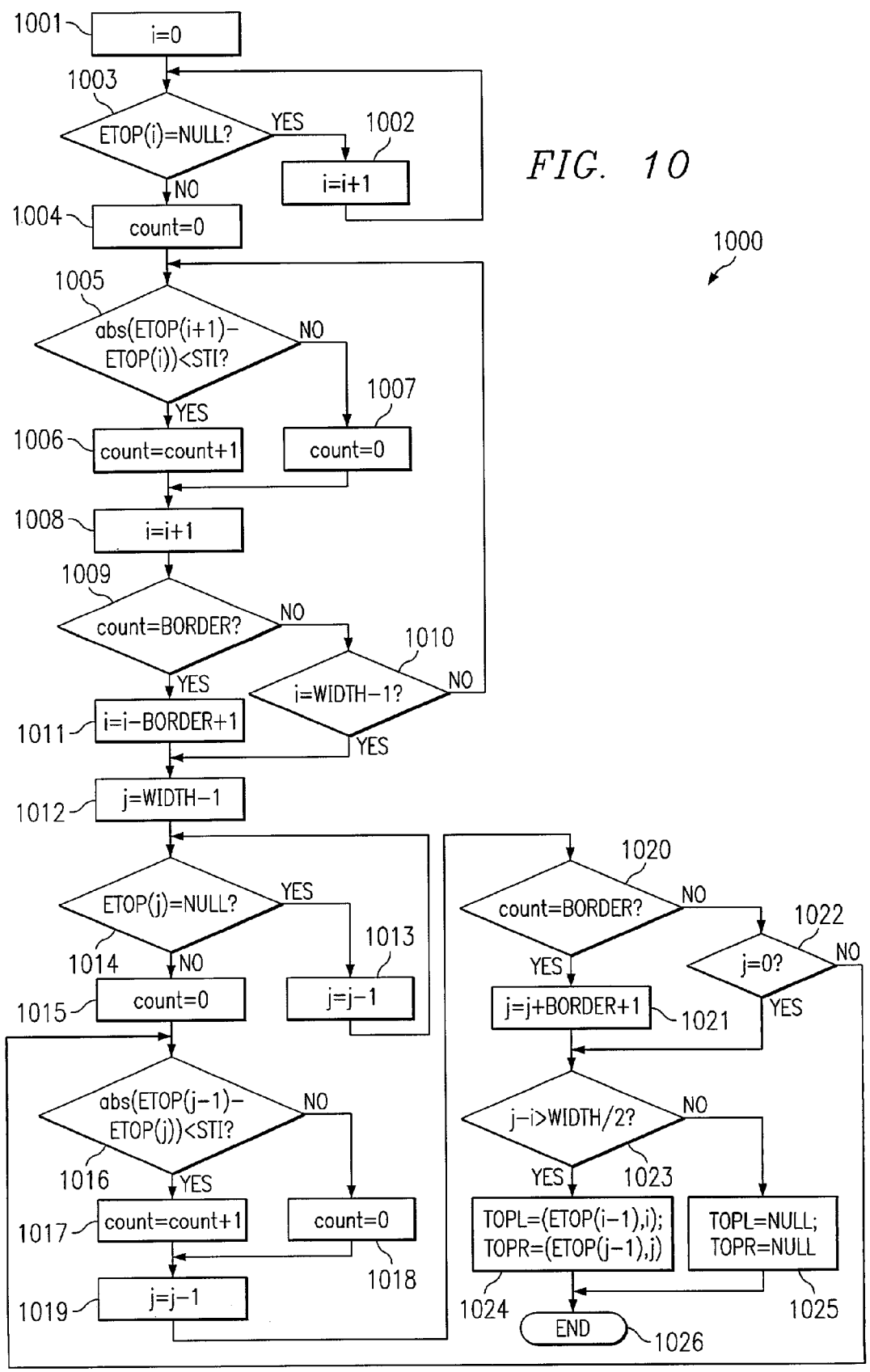
FIG. 10 depicts a flowchart for detecting end points of a detected edge according to embodiments of the present invention.

FIG. 10 depicts flowchart 1000 that may implement edge analysis using a lower slope threshold according to embodiments of the present invention. ST1 is the slope threshold and, in this case, ST1 equals four (4). However, other values may be utilized. BORDER is a threshold for the number of consecutive points on the edge with a small slope and, in this case, is selected to equal fifty (50). However, other values may be utilized for BORDER. WIDTH is the width of the image data. TOPL and TOPR are the locations of the left and right ending points of the top edge. ETOP(i) is a data structure that is utilized to represent the top edge. The value ETOP(i) provides the "x" coordinate that of the top edge that corresponds to the "y" coordinate that equals the value i.

Steps 1001–1003 initialize the process flow and search for the first point of the top edge (ETOP) from the left direction. Steps 1004–1011 search for the top left corner of the top edge. The search is controlled by a logical comparison (step 1005) subject to the lower slope threshold ST1. The search is controlled by a logical comparison (step 1009) based upon the BORDER parameter. The variable i is used as an iterative variable to detect the top left corner. Steps 1012–1014 search for the first point of the top edge from the right direction. In step 1015, count is set to zero before another iterative loop is entered. Steps 1016–1022 search for the top right corner of the top edge. The search for the top right corner is controlled by a logical comparison (step 1016) using the lower slope threshold. The search is also controlled by a logical comparison (step 1020) using the BORDER parameter. The variable j is used as an iterative variable to detect the top right edge. A logical comparison (step 1023) is made to determine whether the variables i and j are sufficiently separated (e.g., separated by a distance greater than the width of the image divided by two). If so, the TOPL data structure is assigned the value of (ETOP(i−1), i) and the TOPR data structure is assigned the value of (ETOP(j−1), j) in step 1024) If not, the process flow ends by assigning a NULL value to TOPL and TOPR (step 1025). In step 1026, the process flow ends.

Edges ELEFT, ERIGHT, and EBOTTOM may be analyzed in a similar manner as discussed with respect to flowchart 1000 of FIG. 10 according to embodiments of the present invention.

It shall be appreciated that the process flow of flowchart 1000 is illustrative. Other suitable detection algorithms may be utilized to detect the end points of edges according to embodiments of the present invention.

The perspective of the image document may be skewed thereby causing one or several edges to be associated with a relatively larger angle as compared to respective reference line. FIG. 11 depicts frame 1100 of an imaged document that is associated with a relatively larger angle. In such a case, the geometry of the detected edges are more complex. For example, FIG. 12 depicts top edge 1200 that corresponds to frame 1100. Top edge 1200 comprises two portions that are associated with two different "real" edges (portion MN and portion NO). In this case, portion MN has a positive slope and portion NO has a negative slope. Thus, by analyzing edge 1200 for a change of the sign of the slope, the turning point N may be detected. Additionally, the sharpness at the turning point may be analyzed as will discussed in greater detail below. The sharpness threshold is utilized to cause the analysis to be robust against noise. Specifically, a minor change in slope will advantageously not be determined to be a turning point according to embodiments of the present invention.

Figure 13:
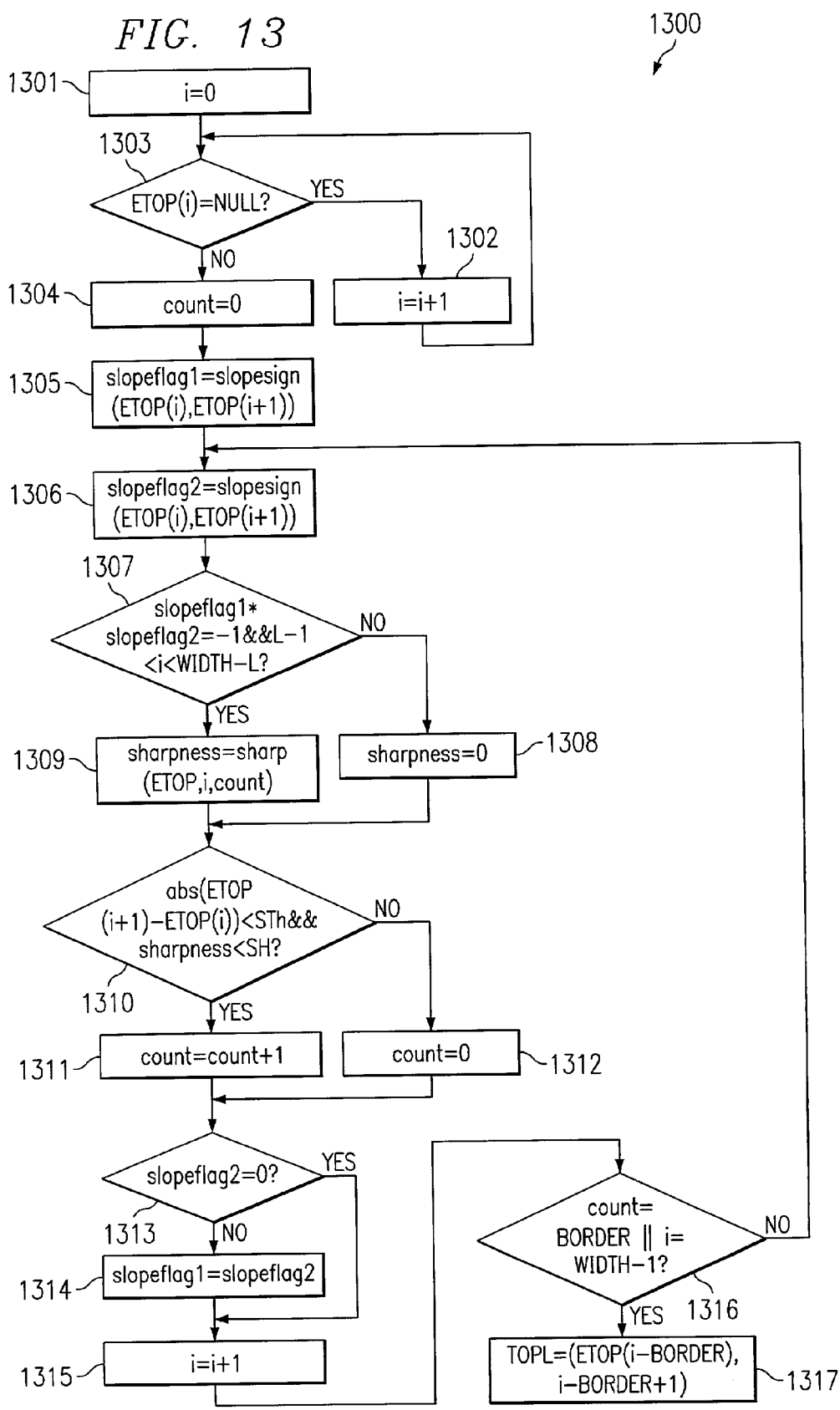
FIG. 13 depicts a flowchart for finding a left end point of a top edge for an edge associated with a relatively large off-angle according to embodiments of the present invention.

FIG. 13 depicts flowchart 1300 that may be utilized to detect the left end point of a top edge that possesses a relatively large angle with respect to a horizontal reference line (e.g., edge 1200). In flowchart 1300, the function slopesign (ETOP(i), ETOP(i+1)) is defined as follows:

$$slopesign(ETOP(i), ETOP(i+1)) = \begin{cases} 1, & ETOP(i+1) > ETOP(i); \\ 0, & ETOP(i+1) = ETOP(i); \\ -1, & ETOP(i+1) < ETOP(i). \end{cases}$$

Also, the function sharp(ETOP, i, count) is defined as:

$$sharp(ETOP, i, count) = \begin{cases} abs(ETOP(i+count) + ETOP(i-count) - ETOP(i)*2), & count < L; \\ abs(ETOP(i+10) + ETOP(i-10) - ETOP(i)*2), & otherwise. \end{cases}$$

In embodiments of the present invention, L is selected to equal ten (10). STh is the higher slope threshold which is selected to equal eight (8). SH is the sharpness threshold which is selected to equal eight (8). Other values may be utilized for L, STh, and SH. BORDER and WIDTH have the same meanings as previously discussed.

The process flow begins by initializing i to equal zero for iterative purposes (step 1301). The variable i is iterated (step 1302) until the first point of the edge is detected by determining whether ETOP(i) is NULL (step 1303). In step 1304, the variable count is initialized to equal zero for iterative purposes. In step 1305, the variable slopeflag1 is assigned using the function slopesign( ).

In step 1306, the variable slopeflag2 is assigned using the function slopesign( ). Also, step 1306 is the first step of the iterative loop that searches for the left ending point of the edge. In step 1307, a logical comparison is made to determine whether the signs of slopeflag1 and slopeflag2 are opposite and whether the variable i satisfies minimal and maximum conditions (i>L-1 and i<WIDTH-L). If the logical comparison is false, the process flow proceeds to step 1308 where the variable sharpness is assigned a value of zero. If the logical comparison of step 1307 is true, the process flow proceeds to step 1309 where the variable sharpness is assigned the value defined by the function sharp( ). From either step 1307 or step 1308, the process flow proceeds to step 1310.

In step 1310, another logical comparison is made to determine whether absolute value of (ETOP(i+1)−ETOP(i)) is less than the higher slope threshold STh and whether the sharpness is less than the sharpness threshold SH. If the logical comparison of step 1310 is true, the value of count is incremented (step 1311). Otherwise, the value of count is set to zero (step 1312).

In step 1313, a logical comparison is made to determine whether slopeflag2 equals zero. If so, the process flow proceeds to step 1315. If not, the value of slopesign2 is assigned to variable slopesign1 (step 1314). In step 1315, the variable i is incremented. In step 1316, a logical comparison is made to determine whether the variable count equals BORDER or whether the variable i equals WIDTH−1. If not, the process flow iterates by returning to step 1306. In step 1317, the left end point of the edge has been detected. Accordingly, the data structure TOPL is assigned the value of (ETOP(i−BORDER), i−BORDER+1).

It shall be appreciated that the right end point of ETOP and the end points of ELEFT, ERIGHT, and EBOTTOM may be then analyzed in a similar manner as shown in FIG. 13.

Figure 14:
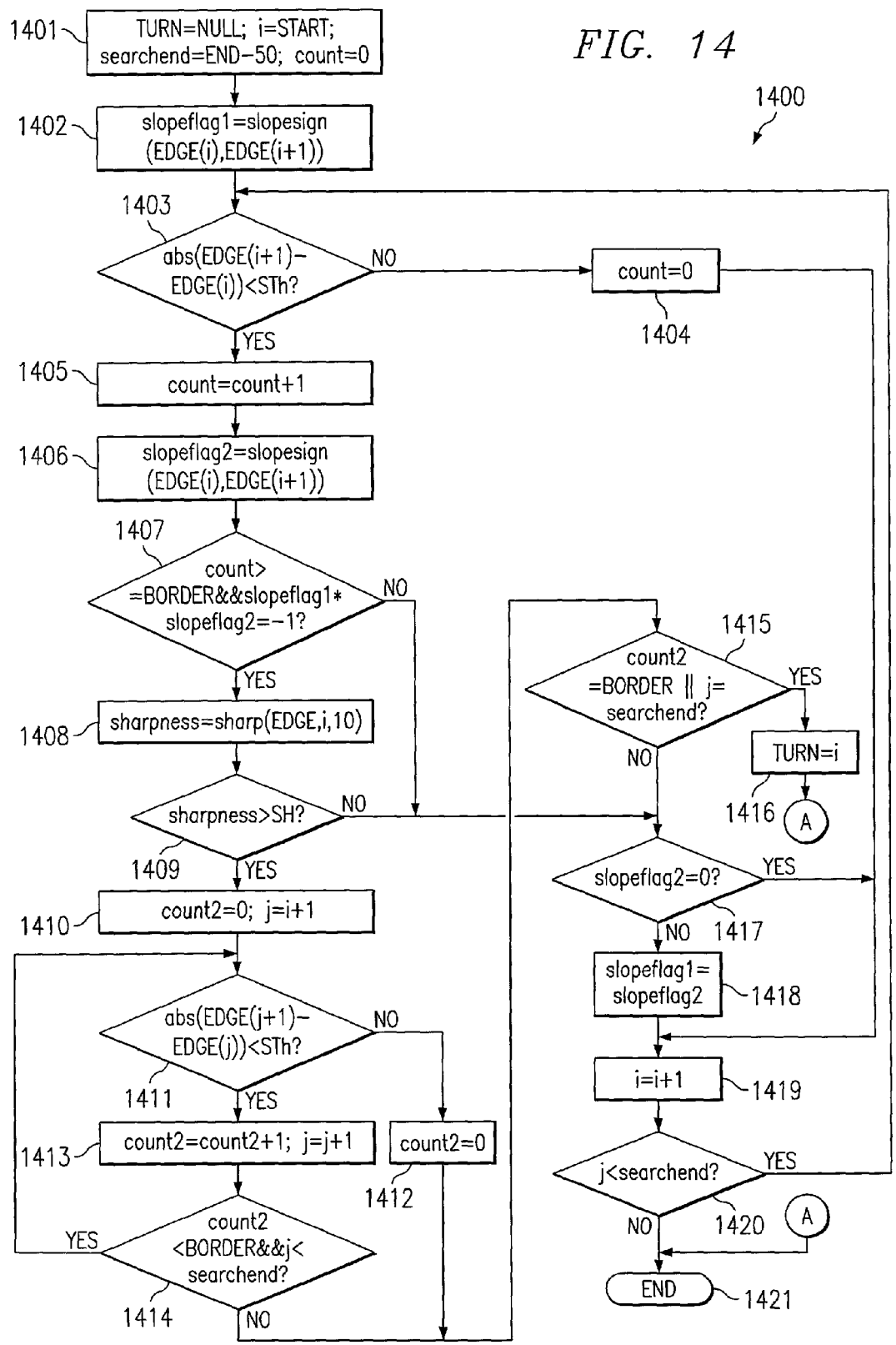
FIG. 14 depicts a flowchart for finding a turning point of a detected edge according to embodiments of the present invention.
Figure 16C:
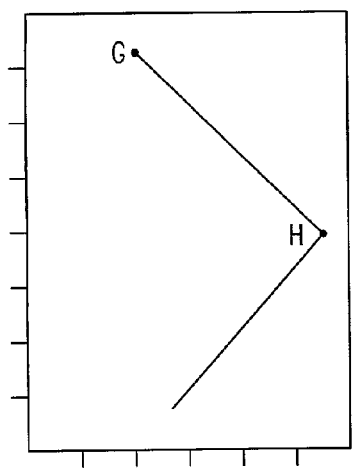
Figure 16D:
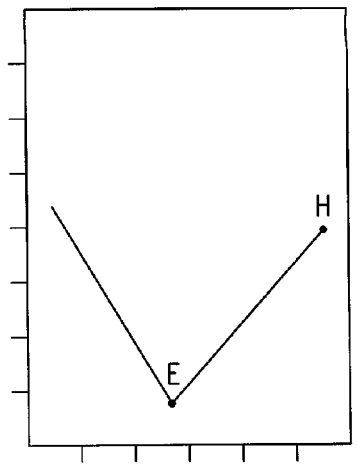

To implement step 804, in part, according to embodiments of the present invention, FIG. 14 depicts flowchart 1400 that detects a turning point between a starting point and an ending point. Flowchart 1400 detects the turning point by examining the slope and sharpness values associated with a respective edge.

Flowchart 1400 begins at step 1401 by initializing several variables. The variable TURN is set to NULL, the variable i is set to START (the starting point location), the variable searchend is set to END-50 (where END is the location of the second end point of the respective edge), and count is set to zero. In step 1402, the variable slopeflag1 is initialized using the function slopesign( ) which was previously discussed. In step 1403, a logical comparison is made to determine whether the absolute value of EDGE(i+1)−EDGE (i) is less than STh (the higher slope threshold). As previously discussed, EDGE( ) is the data structure that represents the various pixels of the respective edge. If the logical comparison is false, the process flow process to step 1404 where the variable count is set to zero and the process flow then proceeds to step 1419. If the logical comparison of step 1403 is true, the process flow proceeds to step 1405, where the variable count is incremented. In step 1406, the variable slopeflag2 is set according to the function slopesign( ).

In step 1407, a logical comparison is made to determine whether count is greater than or equal to BORDER and whether slopeflag1 and slopeflag2 are opposite in sign. If the logical comparison is false, the process flow proceeds to step 1417. If the logical comparison is true, the process flow proceeds to step 1408. In step 1408, the variable sharpness is assigned a value according to the function sharp( ) which was previously discussed. In step 1409, a logical comparison is made to determine whether the variable sharpness is greater than SH (the sharpness threshold). If the logical comparison is false, the process flow proceeds to step 1417. If the logical comparison of step 1409 is true, the process flow proceeds to step 1410.

In step 1410, the variable count2 is set to zero and the variable j is set to i+1. In step 1411, a logical comparison is made to determine whether the absolute value of EDGE (j+1)−EDGE(j) is less than the STh (the higher slope threshold). If the logical comparison is false, the process flow proceeds to step 1412. If the logical comparison of step 1412 is true, the process flow proceeds to step 1413 where the variables count2 and j are incremented. A logical comparison is made in step 1414 to determine whether count2 is less than BORDER and whether j is less than searchend. If the logical comparison of step 1414 is true, a sub-loop of the process flow iterates by proceeding to step 1410. If the logical comparison of step 1413 is false, the process flow proceeds to step 1415.

In step 1415, a logical comparison is made to determine whether count2 equals BORDER or whether j equals searchend. If the logical comparison is true, the process flow proceeds to step 1416. At this point, the turning point has been identified. Accordingly, the variable TURN is assigned the value of i (step 1416) and the process flow ends (step 1421).

If the logical comparison of step 1415 is false, the process flow proceeds to step 1417. In step 1417, a logical comparison is made to determine whether the variable slopeflag2 equals zero. If the logical comparison is false, the process flow proceeds to step 1418 wherein the value slopeflag1 is assigned the value of slopeflag2. If the logical comparison of step 1417 is true, the process flow proceeds to step 1419. If step 1419, the variable i is incremented. In step 1420, a logical comparison is made to determine whether the variable i is less than searchend. If the logical comparison is true, the process flow iterates by proceeding to step 1403. If the logical comparison is false, the process flow proceeds to step 1421 where the process flow ends. If the process flow terminates after the logical comparison of step 1420, no turning point has been located and the variable TURN retains its NULL value.

It shall be appreciated that the process flow of flow chart 1400 is by way of example only. Other suitable algorithms may be utilized to detect a turning point according to embodiments of the present invention.

FIG. 15 depicts flowchart 1500 that analyzes edges for turning points according to embodiments of the present invention. The process flow of flowchart 1500 is applied to each detected edge. In step 1501, for the two end points of an edge, one point is defined as the start point and the other point is defined as the end point. In step 1502, an attempt is made to locate a turning point between the start point and the end point using, for example, the process flow of flowchart 1400. In step 1503, a logical comparison is made to determine whether a turning point was located. If the logical comparison is false, the process flow proceeds to step 1504 where the end points of the analyzed edged are fixed to equal the original detected end points and the process flow proceeds to step 1509 to end. If the logical comparison of step 1503 is true, the process flow proceeds to step 1505.

In step 1505, an attempt to locate another turning point between the first turning point and the other end point is made. A logical comparison is made in step 1506 to determine whether a second turning point is located. If a second turning point is not located, the process flow proceeds to step 1507. In step 1507, one of the end points of the edge are relocated to the first turning point as will be discussed in greater detail below and, then, the process flow ends by proceeding the step 1509. If a second turning point is located, the first and second turning points are used to fix the end points of the analyzed edge (step 1508) and the process flow ends in step 1509.

After the process flow of flowchart 1500 is applied to each edge, the edges may be analyzed to determine if each edge contains one turning point. If so, one turning point of each edge is assigned to be utilized as an ending point for that edge. For example, the assignment may occur in a clockwise manner as depicted in FIGS. 16A–16D with each edge defined by the turning points (E, F, G, and H).

Figure 17A:
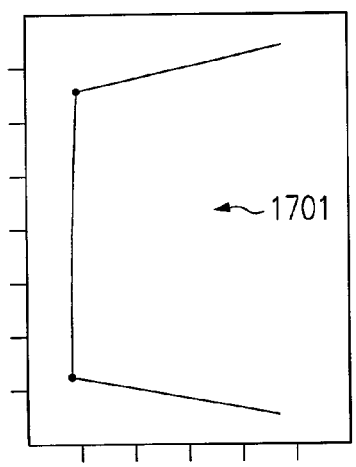
FIGS. 17A–17D depict detected edges that permit end points to be fixed according to embodiments of the present invention.
Figure 17B:
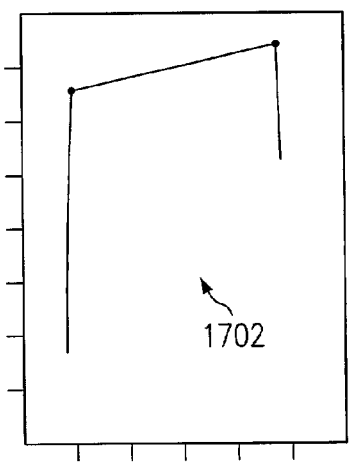
Figure 17C:
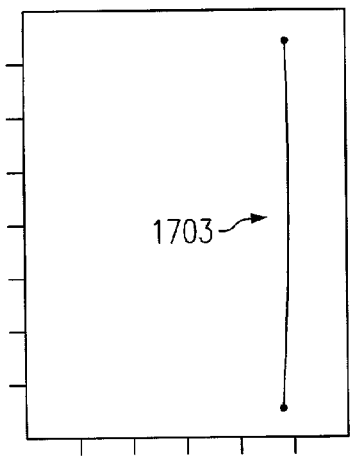
Figure 17D:
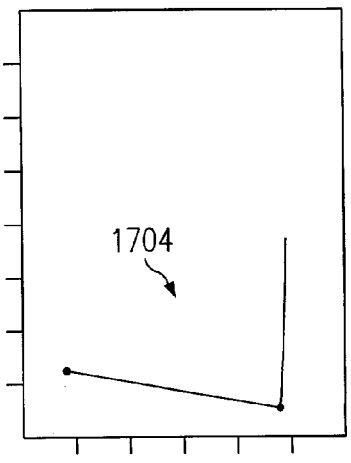

According to the process flow of FIG. 15, the locations of end points of a particular edge may be fixed when there are zero or two turning points for that edge. FIGS. 17A and 17D depict edges 1701 and 1704 where each edge has end points that may be fixed according to embodiments of the present invention. For respective edges that possess only one turning point, their final end point positions may be determined by comparing positions associated with the fixed end points of the other edges.

To compare the ending points according to embodiments of the present invention, the following notation for the end points is used:
Top ending point of left edge: (LTx, LTy);
Bottom ending point of left edge: (LBx, LBy);
Top ending point of right edge: (RTx, RTy);
Bottom ending point of right edge: (RBx, RBy);
Left ending point of top edge: (TLx, TLy);
Right ending point of top edge: (TRx, TRy);
Left ending point of bottom edge: (BLx, BLy); and
Right ending point of bottom edge: (BRx, BRy).

After all of the end points are fixed, the corner locations may be estimated using the following notation for the locations of the corners:
(C1x, C1y), (C2x, C2y), (C3x, C3y), (C4x, C4y).

Accordingly, the final corner locations may be estimated as:

$$C1x=(LTx+TLx)/2;\ C1y=(LTy+TLy)/2;$$

$$C2x=(RTx+TRx)/2;\ C2y=(RTy+TRy)/2;$$

$$C3x=(RBx+BRx)/2;\ C3y=(RBy+BRy)/2;\ \text{and}$$

$$C4x=(LBx+BLx)/2;\ C4y=(LBy+BLy)/2.$$

As previously noted, after the corner locations are determined the imaged document is processed by one of a number of suitable perspective correction algorithms that are known in the art. The selected perspective correction algorithm preferably processes the imaged document to cause the imaged document to be rectangular in shape and to occupy substantially all of the viewable area of the final image area. Suitable perspective correction algorithms may utilize a polygon mapping technique. Specifically, each pixel in the imaged document may be mapped to a polygon in the enhanced image, where the shape of the polygon is dependent upon the position of the pixel and the positions of the corner locations.

When implemented via executable instructions, various elements of the present invention are in essence the code defining the operations of such various elements. The executable instructions or code may be obtained from a readable medium (e.g., hard drive media, optical media, EPROM, EEPROM, tape media, cartridge media, and/or the like) or communicated via a data signal from a communication medium (e.g., the Internet). Embodiments of the present invention may be implemented utilizing other programmable logic such as logic gate implementations, integrated circuit designs, and/or the like. In fact, readable media can include any medium that can store or transfer information.

Figure 1B:
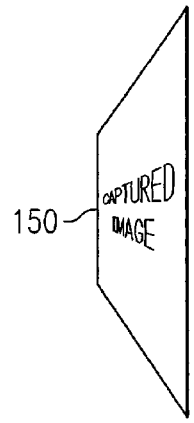
FIG. 1B depicts a skewed digital image of a document according to the prior art.

By applying a suitable perspective correction algorithm and automatic corner detection according to embodiments of the present invention, captured image 150 of FIG. 1B may be transformed into corrected image 300 of FIG. 3. Since the user is not required to manually control the correction algorithm, embodiments of the present invention provide several advantages. First, embodiments of the present invention may be employed in a digital camera without requiring the digital camera to possess a suitable user interface to permit manual manipulation of imaged documents. Secondly, although manual selection of corner locations via a personal computer may be acceptable for a very small number of documents, any appreciable number of documents causes the manually controlled correction algorithms to be quite cumbersome. In contrast, embodiments of the present invention enable a user to image a large number of documents with a digital camera for future review without imposing a substantial editing burden on the user. Moreover, embodiments of the present invention are quite robust to noise in the captured image. By applying an adaptive luminance threshold, embodiments of the present invention are operable to detect the corners of an image document with a relative degree of accuracy.

What is claimed is:

1. A method for processing a digitally captured image that comprises an imaged document, said method comprising:
   transforming said digitally captured image into a binary image, wherein a pixel of said binary image equals: (1) a first logical value when a corresponding pixel in said digitally captured image is associated with a value greater than a luminance threshold; or (2) a second logical value otherwise;
   searching said binary image to detect a plurality of edges of said imaged document; and
   analyzing said detected plurality of edges to determine at least one corner associated with said imaged document;
   wherein said transforming, searching, and analyzing are performed by programmable logic associated with a processor-based system.

2. The method of claim 1 further comprising:
   performing perspective adjustment utilizing said determined at least one corner.

3. The method of claim 1 wherein said first logical value is one and said second logical value is zero.

4. The method of claim 1 wherein said analyzing comprises:
   analyzing a respective magnitude of slope associated with each of said plurality of edges.

5. The method of claim 1 wherein said analyzing comprises:
   searching for a turning point in each of said plurality of edges.

6. The method of claim 5 wherein said analyzing comprises:
   assigning detected turning points as ones of a plurality of corners.

7. The method of claim 1 wherein said analyzing comprises:
   averaging locations associated with end points of ones of said plurality of edges to determine ones of a plurality of corners.

8. A system for processing a digitally captured image that comprises an imaged document, said system comprising:

means for transforming said digitally captured image into a binary image, wherein said means for transforming is operable to assign a first logical value to a pixel of said binary image that corresponds to a pixel of said digitally captured image that is associated with a value greater than a luminance threshold, and is operable to assign a second logical value otherwise;
   means for detecting edges of said imaged document from said binary image; and
   means for estimating at least one corner location of said imaged document from said detected edges.

9. The system of claim 8 further comprising:
   means for performing perspective enhancement of said imaged document utilizing said at least one estimated corner location.

10. The system of claim 8 wherein said means for transforming is operable to calculate said luminance threshold of said digitally captured image.

11. The system of claim 10 wherein said means for transforming is operable to construct a histogram of luminance values of said digitally captured image to determine said luminance threshold.

12. The system of claim 8 wherein said means for estimating is operable to analyze said detected edges to identify turning points wherein said turning points are associated with a change in slope sign of said detected edges with respect to said binary image.

13. The system of claim 12 wherein said means for estimating utilizes detected turning points as corner locations.

14. The system of claim 8 wherein said system is selected from the group consisting of: a personal computer, a personal digital assistant (PDA) and a digital camera.

15. A computer-readable medium comprising executable instructions for processing a digitally captured image that comprises an imaged document, said computer-readable medium comprising:
   code for applying a luminance threshold to said digitally captured image to construct a binary image, wherein a pixel of said binary image equals: (1) a first logical value when a corresponding pixel in said digitally captured image is associated with a value greater than said luminance threshold: or (2) a second logical value otherwise;
   code for detecting edges of said imaged document from said binary image, wherein said code for detecting is operable to search from each respective margin of said binary image for a change in value in said binary image to detect said edges; and
   code for determining at least one corner location from said detected edges.

16. The computer-readable medium of claim 15 further comprising: code for performing perspective enhancement of said imaged document utilizing said determined at least one corner location.

17. The computer-readable medium of claim 15 wherein said code for determining is operable to analyze said detected edges for points associated with a change in sign of slope with respect to said binary image.

18. The computer-readable medium of claim 17 wherein said points associated with a change in sign of slope are utilized as corner locations.

* * * * *